(12) United States Patent
von Mutius et al.

(10) Patent No.: US 9,181,925 B2
(45) Date of Patent: Nov. 10, 2015

(54) METHOD OF SERVICING WIND POWER PLANT USING AZIMUTH ANGLE

(75) Inventors: Martin von Mutius, Ascheffel (DE); Dirk Steudel, Kiel (DE)

(73) Assignee: R E power Systems AG, Hamburg (DE)

( * ) Notice: Subject to any disclaimer, the term of this patent is extended or adjusted under 35 U.S.C. 154(b) by 384 days.

(21) Appl. No.: 13/046,892

(22) Filed: Mar. 14, 2011

(65) Prior Publication Data

US 2011/0288817 A1  Nov. 24, 2011

(30) Foreign Application Priority Data

Mar. 15, 2010  (DE) .......................... 10 2010 011 549

(51) Int. Cl.
F03D 7/02  (2006.01)
F03D 1/00  (2006.01)
(Continued)

(52) U.S. Cl.
CPC .............. F03D 7/0204 (2013.01); F03D 1/003 (2013.01); F03D 7/0264 (2013.01);
(Continued)

(58) Field of Classification Search
CPC ..... F03D 1/003; F03D 7/0204; F03D 7/0268; F03D 7/0244; F03D 7/0264; F03D 11/0091; F05B 2260/84; F05B 2270/1032; F05B 2270/1033; F05B 2270/326; F05B 2270/329; F05B 2270/332; F05B 2270/335; Y02E 10/723; Y02E 10/721; H02P 2203/05; H02P 23/0077; H02P 21/0053; G01L 25/006; G01L 25/00; G01L 25/003; G01L 5/0071; G01L 5/26; G01L 3/08; G01L 3/1421
USPC ......................................................... 702/151
See application file for complete search history.

(56) References Cited

U.S. PATENT DOCUMENTS 7,484,933 B2 * 2/2009 Wobben ........................... 416/1
8,727,731 B2   5/2014 Bendel
(Continued)

FOREIGN PATENT DOCUMENTS

DE  197 17 059 C1  7/1998
DE  3504840         7/2006
(Continued)

OTHER PUBLICATIONS

European Search Report, dated Jul. 1, 2011, issued in parallel application EP 11 00 1715, 5 pages.
(Continued)

*Primary Examiner* — Eliseo Ramos Feliciano
*Assistant Examiner* — Terence Stifter, Jr.
(74) *Attorney, Agent, or Firm* — Nash and Titus, LLC

(57) ABSTRACT

The invention concerns a method for the determination of an azimuth angle for servicing purposes ($\alpha_w$) of a wind power plant with a machinery housing that is rotatable on a tower through an azimuth angle ($\alpha$) and a rotor that is rotatable on a machinery housing through a rotor angle ($\delta$) such that a plurality of combinations of rotor angles ($\delta$) and azimuth angles ($\alpha$) is adjusted, that are determined at the rotor subject to the influence of a turbulent wind field, which is effecting torques, for the adjusted combinations of rotor angles ($\delta$) and azimuth angles ($\alpha$) and the associated azimuth angle ($\alpha$), a torque envelope of the torque-azimuth angle associations is determined, surrounding areas (U($\alpha$)) with comparable sector sizes of the azimuth angle ($\alpha$) are generated and associated magnitude values of the torque envelope are determined, a surrounding area (U($\alpha_w$)) with magnitude-wise smaller torque envelope values than the neighboring surrounding areas is selected and the azimuth angle for servicing purposes ($\alpha_w$) is determined within the selected surrounding area (U($a_w$)).

18 Claims, 3 Drawing Sheets

(51) Int. Cl.
*F03D 7/04* (2006.01)
*G01L 25/00* (2006.01)
*F03D 11/00* (2006.01)

(52) U.S. Cl.
CPC ........... *F03D 7/0268* (2013.01); *F03D 7/0288* (2013.01); *F03D 7/04* (2013.01); *F03D 11/0091* (2013.01); *F05B 2230/80* (2013.01); *F05B 2270/329* (2013.01); *G01L 25/003* (2013.01); *Y02E 10/723* (2013.01)

(56) References Cited

U.S. PATENT DOCUMENTS

| | | | |
|---|---|---|---|
| 2005/0175451 A1 | 8/2005 | Wobben | |
| 2005/0186081 A1 | 8/2005 | Mohamed | |
| 2006/0220386 A1 | 10/2006 | Wobben | |
| 2009/0081041 A1* | 3/2009 | Frese et al. | 416/1 |
| 2009/0278359 A1* | 11/2009 | Trede | 290/55 |
| 2012/0035865 A1* | 2/2012 | Fujioka et al. | 702/42 |

FOREIGN PATENT DOCUMENTS

| | | |
|---|---|---|
| EP | 2 058 513 A2 | 5/2009 |
| WO | WO2006 056196 | 6/2006 |
| WO | WO 2006/050723 | 9/2007 |
| WO | WO 2008/145126 A2 | 12/2008 |

OTHER PUBLICATIONS

German Search Report, dated Mar. 15, 2010, issued in parallel application, DE 10 2010 011 549.5-15, 2 pages.

Pictures cited by German Patent and Trademark Office in Official Communication dd. Oct. 5, 2009 in the case of German patent application DE 10 2008 037 768.6 (marked as D3).

Official Communication from the German Patent and Trademark Office dd. Oct. 5, 2009 in the case of German patent application DE 10 2008 037 768.6 (marked as D3a).

Declercq, J. "Transformers for Wind Turbines . . . ", Pauwels Interntl, Belgium, CIRED 17th Interntl Conference on Electricity Distribution, Barcelona, May 12, 2003 (marked as D12).

Articles in etz—Elekrotechnik+Automation, Heft 18/2003 and Heft 20/2003, VDE-Verlag, showing that D12 was available to the public in 2003 (marked as D12a).

Office Action mailed Jun. 12, 2012, in U.S. patent publication US2010/0308596.

Office Action mailed Jul. 31, 2012, in U.S. patent publication US2010/0308596.

Office Action mailed Dec. 10, 2012, in U.S. patent publication US2010/0308596.

Office Action mailed May 31, 2013, in U.S. patent publication US2010/0308596.

Office Action mailed Sep. 19, 2013, in U.S. patent publication US2010/0308596.

Office Action mailed Apr. 19, 2014, in U.S. patent publication US2010/0308596.

Office Action mailed Mar. 26, 2014, in U.S. patent publication US2011/0262280.

* cited by examiner

METHOD OF SERVICING WIND POWER PLANT USING AZIMUTH ANGLE

BACKGROUND OF THE INVENTION

This invention claims priority from German application DE 10 2010 011 549.5, filed Mar. 15, 2010, and the contents of that application are incorporation herein in their entirety.

The invention concerns a method for the determination of an azimuth angle for servicing purposes of a wind power plant and a method for the servicing of a wind power plant as well as a wind power plant for the implementation of one of the servicing procedures.

Wind power plants should be maintained regularly. Beyond that, damaged wind power plants have to be repaired, for example because of lightning strikes or similar. It can be necessary, in particular if the servicing or a repair concerns the drive train of the wind power plant, to lock the rotor during the repair so that the mechanics can work safely. Such locking is in particular necessary in the case when a rotor bearing is damaged and repair work is performed in that location. Also during the replacing of parts of the transmission, the generator or similar in the machinery housing, the rotor has to be necessarily locked during the servicing work. In a known manner the machinery housing is aligned along with the rotor in the direction of the wind and the rotor blades are placed in feathered position and the rotor is then locked.

Disadvantageous in the context of the known servicing procedures is however the appearance of relatively large torques at the rotor in the case of changing directions of the wind. In particular in the case of servicing work that is difficult to estimate in duration, such as in the case of the replacing of rotor bearings or the disassembly of a transmission, the servicing state has to be verified taking into consideration a once-a-year-gust, wherein torques on the order of three times the nominal torque can occur.

SUMMARY OF THE INVENTION

It is the object of the invention to provide an improvement of the known servicing procedure, a method for the provision of the parameters necessary for the improved servicing procedure, as well as a wind power plant for the implementation of a servicing procedure.

Basically the term of the servicing or the servicing work is to be very broadly interpreted in this context, in particular not only routine servicing is to be understood thereby, but also the replacing of parts and other objects.

The problem is solved in regard to the method for the provision of the required parameters by means of a method for the determination of the azimuth angle for servicing purposes of a wind power plant. The wind power plant features a machinery housing that can be rotated on a tower through an azimuth angle.

Preferably the machinery housing can be rotated by a wind tracking system about a rotation axis that is, relative to the ground, essentially vertical and extends preferably along the longitudinal direction of the tower. The azimuth angle is an angular position of the machinery housing about the rotation axis.

In reference to the azimuth angle for servicing purposes in this context the angular position of the machinery housing relative to the direction of the wind is understood to be the one into which the machinery housing is rotated for the servicing of the rotor or the drive train that follows it. It can be locked on the tower at the azimuth angle for servicing purposes or preferably be repositioned, in the azimuth angle for servicing purposes, relative to possibly arising changes in the direction of the wind.

The direction of the wind of the wind field that impinges on the installation is preferably chosen as the zero angle of the azimuth angle measurement. Alternatively an arbitrary direction, in particular also the main direction of the wind of the site, can also be selected as a zero-point. In the case of the alternative, the difference angle between the selected direction and the thereby determined azimuth angle for servicing purposes on the one hand, as well as the selected direction and the direction of the wind on the other, is however the physically relevant angle that is incorporated into the method of determination according to the invention.

The wind power plant features a rotor that is disposed in a rotatable manner on the side of a machinery housing that during operation is preferably aligned into the wind. The angular position of the rotor about a rotor rotation axis that is preferably disposed in a longitudinal direction of the machinery housing is here referred to as the rotor angle. The rotor rotation axis is preferably disposed essentially horizontal relative to the ground. The formulation here also encompasses embodiment forms wherein the rotation axis can be inclined at a tilt angle, which frequently is between 3° and 10°, relative to the ground.

The position of one of the rotor blades along the longitudinal direction of the tower and above the machinery housing is provided as zero-position of the rotor angle measurement, the so-called 12 o'clock position of one of the rotor blades. The method according to the invention for the determination of the azimuth angle does not have to be based on a full revolution of 360° but only on the smaller sector of 0° to 120° because of the 120° symmetry, if the rotor is implemented with three rotor blades that are spaced apart from one another by 120° in the direction of rotation. In the case that construction-based tolerances in the rotor symmetry have to be taken into account, a full rotor rotation is to be used as a basis.

The idea of the invention is based on the startling realization that it is not always useful to select the azimuth angle for servicing purposes in such a manner that in the exact position of the azimuth angle for servicing purposes the lowest torque is obtained at the rotor.

In practice it has turned out that further-reaching criteria that affect the environment of the azimuth angle for servicing purposes are of more significance for the loading than the sole or at least predominant criterion of a torque minimum exactly at the azimuth angle for servicing purposes. The method of determination according to the invention intends therefore in particular to find an azimuth angle for servicing purposes into which the machinery housing is rotated for the purpose of servicing and that permits within a whole range of variations of the direction of the wind only torques on the rotor that are as small as possible. The rotor is preferably locked during the servicing while the machinery housing remains preferably rotatable even during the servicing, in particular in order to be able to be repositioned with a direction of the wind that changes during the servicing.

The azimuth angle for servicing purposes can be determined for a certain wind power plant type by means of simulation or by means of the recording of actual measurement values obtained through installed measurement instruments on the wind power plant itself. Initially a wind field is prescribed by means of simulation or actually by nature, and it is associated with a direction of the wind. The direction of the wind can be the actual main wind direction in the case of varying wind. However, only the angle between the direction of the wind and the orientation of the rotor rotation axis is critical for the determination of the torques and as a basis for the method of determination of the azimuth angle for servicing purposes. Even in the case of simulations turbulent wind fields are preferably considered since by these means real circumstances are significantly better represented.

According to the invention a plurality of combinations of rotor angles and azimuth angles is configured for the method of determination numerically by means of a simulation program or on an actual wind power plant.

One has to distinguish on the one hand which combinations are even the basis of the determination of an azimuth angle for servicing purposes and on the other, how the combinations required therefore are determined. For the determination of the combinations of rotor angle and azimuth angle one has to distinguish especially the case of the locked rotor at constant rotor angle on the one hand and the variable rotor angle for the determination of the azimuth angle for servicing purposes on the other. In particular the azimuth angle for servicing purposes can be determined for individual locked rotor angles or simultaneously for several or all rotor angles.

Preferably for each individual one of the combinations the torques are determined that act on the locked rotor due to the wind field, in particular also turbulent wind fields. The determination of the torques can be accomplished likewise numerically by means of a simulation program or metrologically by means of a torque meter that is disposed on the rotor of the rotor shaft or the following drive train. Both can also take place in combination, wherein in particular the results of the simulation are supported through measurements and, if applicable, adapted. In the case of the simulation the torques are calculated. In particular in the case of a simulation the direction of the wind can be selected such that it is directly from the North. The calculation is thereby simplified.

In particular in the case of the implementation of simulations it does not matter whether the rotor angle is modified in the case of a locked azimuth angle or the reverse, the azimuth angle in the case of a locked rotor angle, or whether in Monte Carlo simulations sequentially arbitrary combinations of both angles are considered until the area of investigation has been sufficiently covered.

For the determination of the torques acting at the rotor in the case of variable rotor angles and azimuth angles with different wind strengths simulation procedures as well as also real measurements can be performed. Simulation procedures provide also for any number of combinations of azimuth angles and rotor angles torque values by simple, because numerical, means, but these can deviate from the actual torques. Actual measurements of the torque in the case of different angle combinations by means of torque meters are more accurate but more time consuming, and can only even be performed in the case of sufficiently strong wind.

For torque measurements, for example in the case of a locked rotor angle, the azimuth angle can be modified and a measurement can be performed after each modification of the azimuth angle until the azimuth angle has traversed a 360° revolution. Thereafter a new rotor angle can be adjusted and a corresponding new measurement sequence can be performed.

Preferably however, especially in the case of the determination of the values by means of measurements, in a reverse manner the azimuth angle is locked and the rotor angle is modified between 0° and 120° and torque meter values are recorded for each modification in order to continually rotate the azimuth angle in a tracking manner by a certain increment and to in turn modify in the new position the rotor angle in the mentioned angle sector.

From a practical point of view it is easier and less time intensive to readjust the rotor angle several times across larger angle sectors simply by means of rotating the rotor angle and repeated braking to a stop then to repeatedly readjust the azimuth angle for servicing purposes by means of rotation of the entire machinery housing across larger angle sectors.

In the case of a locked rotor angle the plurality of combinations of rotor angle and azimuth angle is generated by means of the modification of the azimuth angle. In the case of simulations the torques that appear are determined subject to the influence of a typically synthetically generated wind field that is preferably turbulent.

The calculated or measured torques are associated with the azimuth angle of the combination. By these means a fixed azimuth angle can be associated with, depending on a rotor angle, a plurality of torques that are different from one another. In particular due to changes of the wind strength and the direction of the wind over time the rotor is associated with different torques even in the case of a fixed rotor angle at constant azimuth angle.

A torque envelope of the torque-azimuth angle associations is determined. The torque envelope envelopes the determined torque-azimuth angle associations in a representative form. This can mean different things: The envelope can encompass the magnitude-wise largest torque values to preferably each one of the azimuth angles. Neighboring torque values that are magnitude-wise the largest can be connected as envelope values preferably in a continuous, in particular polygonal or smooth manner, to the envelope.

Instead of the magnitude-wise largest torque values for each of the azimuth angles one can ascertain as an envelope value also statistically from an average torque value of the determined torques for each azimuth angle, and preferably in consideration of the associated standard deviation. In the latter case a multiple of the standard deviation of the determined torques is added to the average torque value of the azimuth angle depending on the desired design tolerance safety. There are however also other known methods possible for the determination of the envelope that are based on methods for the evaluation of stochastic data.

In particular can the determination of the torque envelopes a priori be based on combinations of rotor angles and azimuth angles, wherein also the rotor angle can be modified. For each prescribed, fixed rotor angle respectively an azimuth angle for servicing purposes can however also be determined, wherein the individual azimuth angles for servicing purposes are preferably subsequently compared with one another. In the process a torque envelope is then determined for each prescribed rotor angle.

By fixing the rotor angle $\alpha$ particularly optimal azimuth angle for servicing purposes depending on the rotor angle can be determined that features particularly low torque values.

The torque envelope associates preferably exactly one torque envelope value with each azimuth angle. The torque envelope is in the case of the mentioned embodiment form of the invention the basis for the further method steps for the determination of the azimuth angle for servicing purposes.

Surrounding areas of the azimuth angles are formed. By surrounding area is here meant an angle range around a prescribed azimuth angle. The surrounding area features a certain sector size, meaning that it covers a certain azimuth angle range. Surrounding areas can be formed that are spaced apart from one another by a preferably equally large increment of azimuth angles. The surrounding areas can however also be implemented continuously along the azimuth angle axis. The azimuth angles of the surrounding area are preferably associated with unique torque envelope values.

The surrounding areas feature a comparable sector size. The surrounding areas can in particular all lie within a prescribed sector size area. The sector size area is preferably formed from an average sector size with a tolerance of ±10%, preferably ±5% of its sector size. In this context all other deviations between ±20° to ±1° from an average sector size are however also to be disclosed. In the most optimal case all surrounding areas are essentially equally large, preferably all exactly equally large and preferably symmetric about the azimuth angle that is associated with them and that is preferably arranged in a centered manner within the surrounding area.

The sector size of the surrounding areas around an azimuth angle takes into account the changing directions of the wind because it is physically equivalent whether the azimuth angle is changed in respect to a direction of the wind that remains constant within the surrounding area and the torques acting on the rotor are measured, or whether in reverse the azimuth angle remains fixed relative to the ground and the direction of the wind is changed within the sector size of the surrounding area in respect to the ground, and then the torques acting on the rotor are measured.

The sector size is a measure for the preferably commonly prevailing variations in the direction of the wind at the location of installation. Preferably the sector size is about ±15°, in particular preferred about ±8°.

The azimuth angle for servicing purposes is determined within a selected surrounding area. The surrounding area is selected by determining the associated magnitude values of the torque envelope values and comparing the torque envelope values of the different surrounding areas with one another, and one surrounding area with the magnitude-wise smaller torque envelope values is selected.

Preferably the magnitude-wise largest torque envelope value is respectively determined from within a plurality of surrounding areas, preferably from each individual surrounding area; the respectively magnitude-wise largest torque envelope values of the surrounding areas are then compared with one another and that surrounding area is selected whose thereby determined magnitude-wise largest torque envelope value is the smallest of the torque envelope values that were compared with one another.

The maximal difference of the torque envelope values within the surrounding areas can also be determined and the surrounding area with the smallest difference be selected.

The azimuth angle for servicing purposes is then determined within a selected surrounding area. For that purpose the average value of the sector can be determined as the azimuth angle for servicing purposes. Preferably the azimuth angle is determined as azimuth angle for servicing purposes that is associated with a minimum that is local and, with respect to the surrounding area, a global minimum of the torque envelope in the selected surrounding area. As a result the torque that engages at the rotor during servicing is particularly low in the case of wind that is blowing from the main wind direction.

In a particularly preferred case the torque that is associated with the azimuth angle for servicing purposes is implemented as a local torque minimum. In the process this can also be the minimum that is closest to the average value of the surrounding area.

In a further embodiment form of the method according to the invention the minimum with the highest neighboring maxima is determined within each of the surrounding areas. Subsequently the surrounding area is selected whose highest neighboring maximum is the smallest.

The minimum associated with the smallest maximum is then determined as the azimuth angle for servicing purposes.

It is also conceivable to determine an average slope on each of the two sides of a preferably average value of the surrounding area for the determination of the azimuth angle for servicing purposes and to select the surrounding area with the magnitude-wise smallest average slopes on each of the two sides and to determine the azimuth angle for servicing purposes as the average value of the selected surrounding area.

Furthermore a slope can be determined on every point of the surrounding area and a surrounding area with the smallest slopes can be selected and a minimum of the selected surrounding area can be determined as azimuth angle for servicing purposes.

In another embodiment form of the method of determination according to the invention the azimuth angle associated with the broadest minimum is selected for servicing. The broadest minimum is thereby understood to be the minimum within the selected surrounding area that features within its immediate surrounding area the smallest slopes of the torque envelopes in comparison to the immediate surrounding areas of other minima. Since the broadest minimum does not necessarily have to be the global minimum, the torque can admittedly be somewhat larger in the case of wind that is blowing from the main wind direction; however the torques in the case of variations of the direction of the wind about the broadest minimum are, if applicable, smaller than in the case of variations about the global minimum.

In particular a preferred embodiment form of the invention provides for a combination of two or more of the selection criteria listed above, wherein in particular a weighting of the individual criteria by means of a weighing factor is performed.

The problem is secondly solved by means of a method for the servicing of a wind power plant with a machinery housing that is rotatable on a tower through an azimuth angle and a rotor that is rotatable on a machinery housing through a rotor angle, wherein the machinery housing is rotated into an azimuth angle for servicing purposes determined by means of at least one of the methods mentioned above, the rotor is locked and the machinery housing is maintained while retaining the azimuth angle for servicing purposes.

The rotor is locked during the servicing according to the invention in order to even just be able to perform the servicing work on the resting drive train in a safe manner. The machinery housing is rotated into the azimuth angle for servicing purposes and can be locked there.

Preferably however the machinery housing is rotated by means of a wind tracking installation even during the servicing work in the case of changes in the direction of the wind and is repositioned relative to a, if applicable, direction of the wind or main wind direction that changes during the servicing.

In a preferred further improvement of the servicing procedure according to the invention azimuth angles for servicing purposes that are associated with different rotor angles are stored in an electronic memory together with the respective rotor angle. The rotor angle is measured with a measurement installation, preferably an angle measurement installation that is connected with a data processing unit; by means of the data processing unit the measured rotor angle is associated with the assigned azimuth angle for servicing purposes and the wind tracking installation rotates the machinery housing into the associated azimuth angle for servicing purposes. The servicing procedure is optimally utilized when several torque-azimuth angle-correlations that are parameterized by means of the rotor angle are stored. By these means a servicing that is adapted to the rotor angle is possible with low torque loading.

The method is particularly suitable for application in the case of rotors that are no longer rotatable due to a defect.

In another preferred further improvement of the method according to the invention the rotor is rotated prior to its locking into a rotor angle for servicing and into an azimuth angle for servicing purposes that is associated with this rotor angle for servicing purposes. Both angles can be adjusted in arbitrary sequence one after the other or also simultaneously.

The latter mentioned method can however only be implemented if the rotor is still rotatable despite the defect.

Preferably the machinery housing is rotated into an azimuth angle for servicing purposes between −170° and −100° or between 100° and 170°, particularly preferred at −135° or +135°. Accordingly particularly optimal azimuth angles for servicing purposes are located in these angle sectors.

In a particularly preferred improvement of the invention a drive train disposed in the machinery housing is at least partially disassembled, a communication connection between the data processing unit and a hub of the rotor is interrupted and an auxiliary installation is connected with the data processing unit, and with that the communication connection to the hub of the rotor is simulated.

The data processing unit that is disposed in the machinery housing takes over in an advantageous embodiment of the invention also the adjustment and the control of the wind power plant during normal operation for grid connection. Usually for this purpose the blade pitch is adjusted by a blade pitch adjustment system that is disposed in a rotor hub. As a primary braking system the blade adjustment is of central importance for the safety of a large wind power plant. The communication between the data processing unit and the blade adjustment system in the rotor hub usually takes place via a cable that is guided through a bore hole in a rotor shaft or a king pin, and if necessary through a main transmission. The data transmission from the stationary to the rotating system takes place advantageously by means of slip rings or a non-contact rotary feed-though. Occasionally the method according to the invention with the locking of the rotor is utilized for the replacing of components, for example the cable connection, the slip rings, the blade adjustment system or even the entire main transmission, so that an interruption of the communication connection to the rotor hub is necessary. In particular in the case of older wind power plants the interruption of the communication with the blade adjustment that is critical for safety leads to a state in which the entire control of the wind power plant is no longer capable of functioning. Therefore the data processing unit or control can also not activate a wind tracking installation for the adjustment of an azimuth angle for servicing purposes.

In order to avoid this, a particularly advantageous embodiment form of the invention provides that for such work the communication connection into the rotor hub is replaced by an auxiliary installation that simulates a functioning communication into the rotor hub. The switching of the plugs of the auxiliary installation to the connection of the communication connection can take place in a few minutes in which no larger changes in wind velocity and/or direction of wind are to be expected.

Such an auxiliary installation, also called a "hub simulation box", simulates among other things for the data processing unit the status messages that are transmitted for example by a normally operating blade adjustment system or another component into the rotor hub, e.g. an emergency cut-off switch, blade de-icing systems, sensor or other systems, in order to simulate for the data processing unit an operationally ready state. After the start of the method according to the invention and the switching of the plugs to the auxiliary installation the plant is in a secure servicing mode so that even repairs that will take longer can be performed without danger. After completion of the work the auxiliary installation is of course replaced again by the proper communication connection with the rotor hub.

Preferably the rotor lock is only released after the communication connection into the rotor hub has been reestablished to be error-free and tested. A very secure method is thereby provided.

Alternatively to this embodiment form of the method according to the invention a servicing module can for this purpose be provided, in wind power plants to be newly developed, in the data processing unit or control of the wind power plant, in which the wind tracking system remains operational despite interrupted communication to the rotor hub.

The problem is also solved by means of a wind power plant with a machinery housing that is rotatable on a tower through an azimuth angle and a rotor that is rotatable at a machinery housing through a rotor angle, and with an electronic memory for at least one azimuth angle for servicing purposes and one wind tracking installation by means of which the machinery housing can be rotated into one of the azimuth angles for servicing purposes.

In a most practical manner several azimuth angles for servicing purposes for different rotor angles are stored in the electronic memory together with the rotor angle.

An angle measurement installation of the rotor angle is connected with a data processing unit and in the data processing unit an azimuth angle for servicing purposes is associated with a measured rotor angle, and the machinery housing can be rotated into the azimuth angle for servicing purposes with a wind tracking installation.

The memory and/or the data processing unit can be a component of the wind power plant. Such a wind power plant is self sufficient.

It is however also conceivable that the wind power plant features an external interface via which the rotor angle data can be released to a central data processing unit, in particular that of a wind park, and by means of which the data of the azimuth angles for servicing purposes can be called up from a central memory installation that is provided for a wind park.

Advantageously several memory and data processing units are thereby omitted.

BRIEF DESCRIPTION OF THE FIGURES

The invention is described on the basis of an embodiment example in four figures. It is thereby shown.

DESCRIPTION OF CERTAIN OF THE EMBODIMENTS

Figure 1:
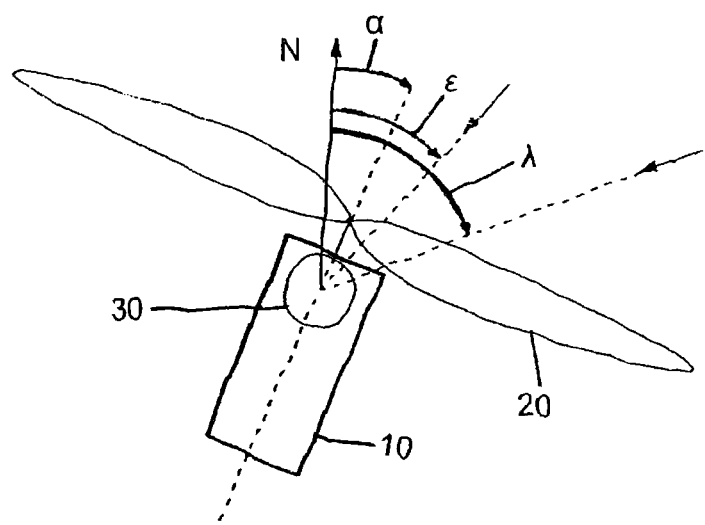
FIG. 1 a schematic representation of a wind power plant,
FIG. 2 a schematic side view of a wind power plant,
FIG. 3 a schematic front view of a wind power plant,
FIG. 4 a graphical representation of the torques depending on the azimuth angle in the case of four different rotor positions.

FIG. 1 presents in a schematic plan view a wind power plant with a machinery housing 10 and a rotor 20. The tower 30 that is provided on the bottom end of the machinery housing 10 is simultaneously the rotation axis of the machinery housing 10 with the rotor 20. An angular position of the rotor 20 relative to North N, as an arbitrarily selected reference point, is referenced as azimuth angle α. The azimuth angle α can be controlled via a drive that rotates the machinery housing 10 on the tower 20. A direction of the wind ε is marked relative to the same reference point North N. During operation the rotor 20 is repositioned to the direction of the wind ε by means of a change of the azimuth angle α, so that both essentially coincide. The difference between azimuth angle α and the direction of the wind ε in FIG. 1 illustrates the azimuth angle for servicing purposes $α_w$ according to the invention.

In FIG. 1 the angle λ of the wave direction of the wind relative to North N is also marked. Usually the wind blows from the direction of the wind ε at a wind strength that varies waveform-like about an average value. In particular the wave direction λ can deviate from the direction of the wind ε.

Figure 2:
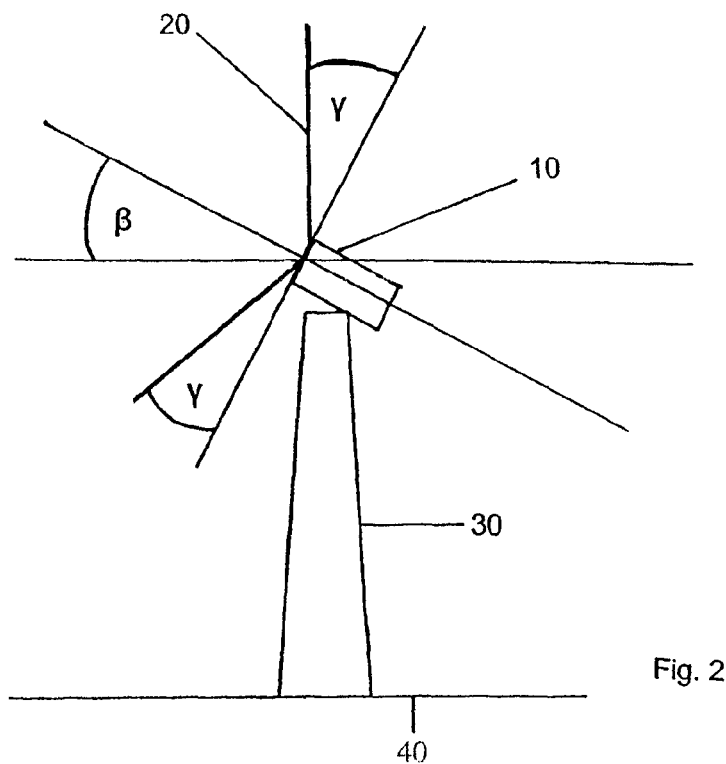

FIG. 2 presents the basic construction of the wind power plant according to FIG. 1 in a side view. The machinery housing 10 is disposed on a tower 30 and can be rotated by a (not marked) azimuth angle α. During operation the rotor 20 is provided on the windward side of the machinery housing 10 FIG. 2 presents a tilt angle β, of the machinery housing 10, that is displayed in an exaggerated manner for illustration purposes. The tilt angle β is defined as an angle of a longitudinal axis of the machinery housing 10 relative to the tangential to the ground surface (horizontal). The windward side of the machinery housing 10 is slightly raised by the tilt angle β in FIG. 1.

FIG. 2 also presents the cone angle γ of the rotor 10. The cone angle γ is selected to be equal for all three rotor blades that are spaced apart from one another by 120°. The cone angle γ is definition-wise the angle by which each individual of the rotor blades is inclined out of the rotor blade plane of the rotor 20 of the machinery housing 10 on the windward side.

Figure 3:
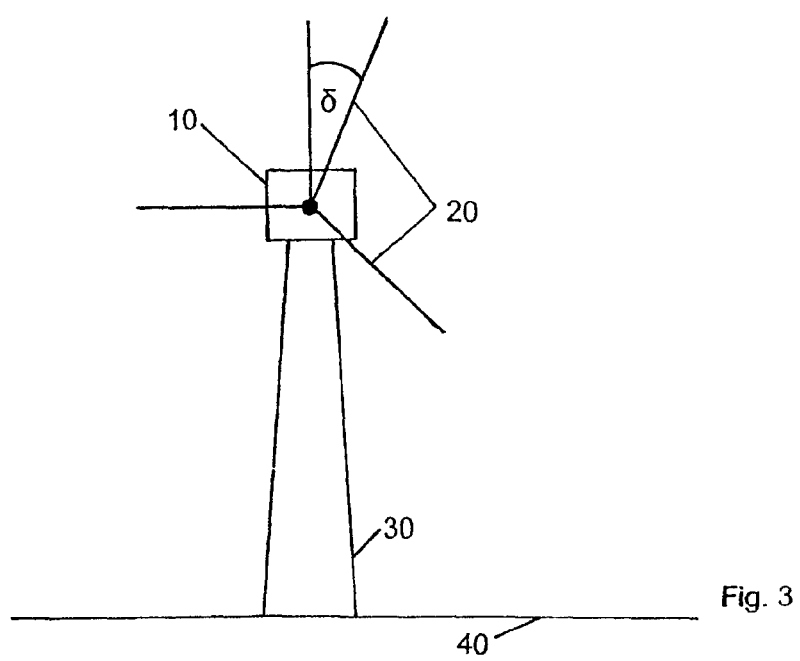

FIG. 3 presents the wind power plant in a front view with the rotor angle δ that continuously changes during operation. The rotor angle δ is the angle of a predetermined rotor blade 20 relative to the vertical to the ground 40. It is therefore between 0° and 360°. In the case of symmetrical rotors a distinguishing of the individual blades is not necessary for the implementation of the method according to the invention, which is why the range of 0° to 120° is sufficient. The vertical coincides in FIG. 3 with the longitudinal direction of the tower 30.

In regard to an azimuth angle $α_w$ for servicing purposes the azimuth angle α is understood into which the machinery housing 10 is rotated, relative to the direction of the wind, for servicing of the wind power plant. In a prescribed angle surrounding area of the azimuth angle for servicing purposes $α_w$ the highest torques acting on the locked rotor 20 are minimal. The different torques arise because of the easily changing wind velocities and -directions, the so-called wind turbulence to which the locked rotor 20 is exposed.

The azimuth angle for servicing purposes $α_w$, is determined individually for each wind plant type. It depends thereby in particular on the tilt angle β and the cone angle γ, but also on the twist and other geometry of the rotor blade. The twist of the rotor blade is primarily the inherent twist of each individual rotor blade along its longitudinal direction. In case of the selection of other rotor blades with the same wind power plant type typically therefore a different azimuth angle for servicing purposes $α_w$ results. In the case of another tilt angle β and/or cone angle γ likewise a different azimuth angle for servicing purposes $α_w$, results. In the case of only minor geometric changes the modification of the azimuth angle for servicing purposes $α_w$, can be so small that it can be neglected for practical purposes.

Figure 4:
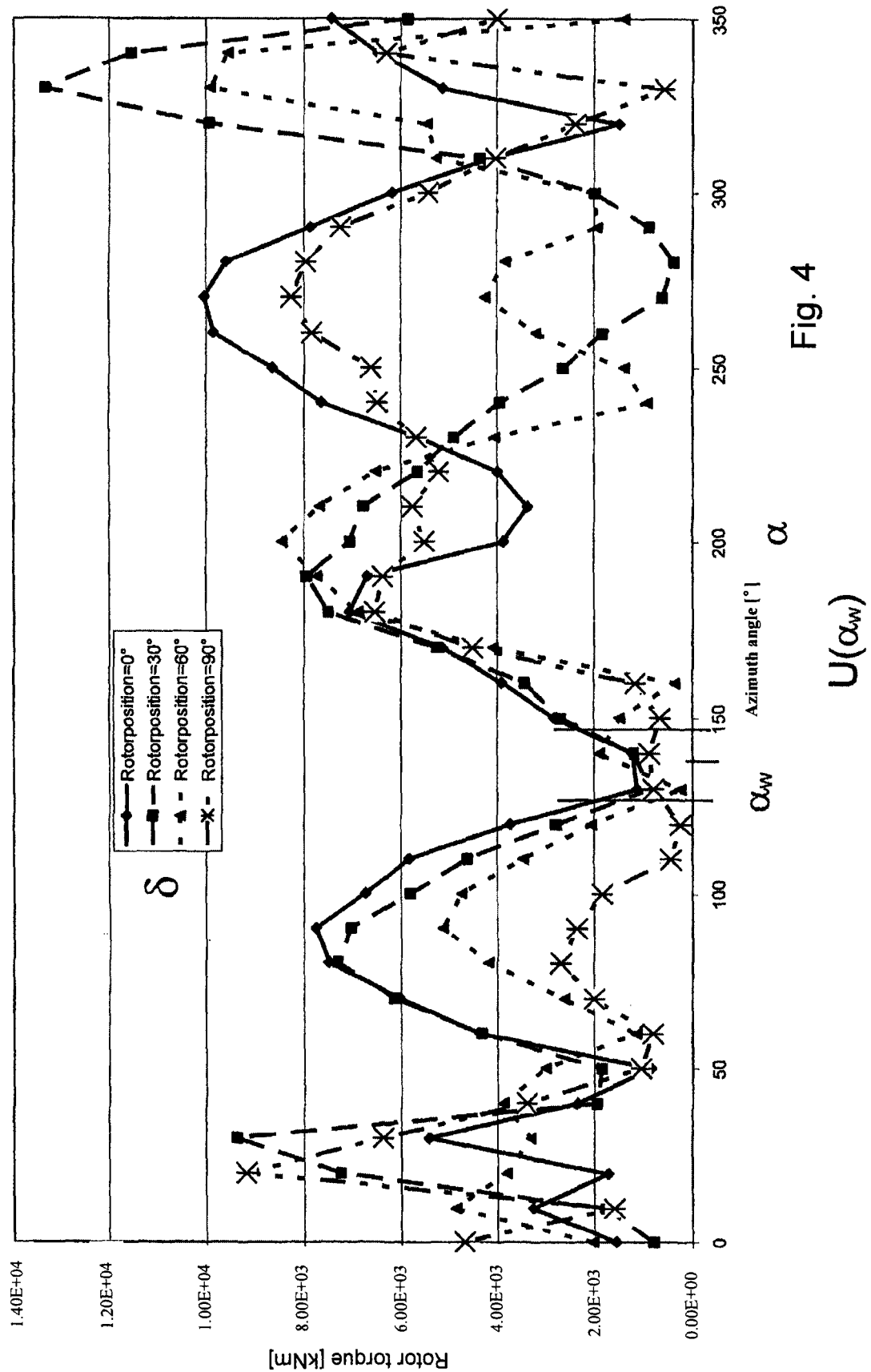

The method for the determination of the azimuth angle for servicing purposes $α_w$, is thereby explained based on FIG. 4.

Initially the direction of the wind ε is determined. The rotor 20 is aligned in the direction of the wind ε. The direction of the wind ε in FIG. 4 is North N and thereby ε=0. The azimuth angle α is measured relative to North N.

Each rotor blade is positioned in the so-called feathered position, meaning it is rotated relative to the operational position at partial load (fine pitch), for example by 91° about its respective longitudinal axis. In the feathered position the wind that is coming exactly from the direction of the wind N creates a minor torque. For the determination of the torque a torque meter can be provided at the rotor bearing between machinery housing 10 and rotor 20, or a strain-gauge-bridge on the rotor shaft.

The torque determination in FIG. 4 is however performed by means of a simulation program.

Initially the rotor angle δ=0° is selected. In this rotor angle δ the longitudinal direction of one of the three rotor blades is disposed vertically upward (pointing away from the ground 40). For the rotor angle δ=0° the torque is determined for a series of equally spaced azimuth angles α. The curve that is parameterized by means of the rotor angle δ=0° is identified by a line with diamonds. Each individual value can thereby be for example the average value or the maximum value of many individual measurements, so that the represented line with diamonds can already be the envelope of many individual values. In FIG. 4 determinations of the torque are performed at separations of α=10°. The determinations were performed for the azimuth angles α that were spaced apart by 10° from each other through a complete revolution of 360° of the machinery housing 10 about the tower 30. The torque curve for the rotor angle δ=0° features minima at α=30°, 50°, 135°, 210°, and 315°.

FIG. 4 presents a torque curve also for rotor angle δ=30° (curve of squares), for δ=60° (curve of triangles) and for δ=90° (curve of stars). Along each curve each of the rotor blades is in the feathered position. Additional parameterized curves can also be determined.

In a next step an envelope (that is not shown) of the four curves is determined from the four parameterized torque curves in FIG. 4. The envelope is defined through the maximal torque value of the four curves for each azimuth angle.

The determination of the azimuth angle for servicing purposes $α_w$ takes place based on the envelope.

Initially a surrounding area U(α) of the defined sector size is prescribed, for example U(α)=±10°. The surrounding area U(α) is then shifted via the x-axis in FIG. 4, continuously starting from α=0° to α=360° in reference to the middle point of the surrounding area U(α). For every position of the surrounding area U(α) along the x-axis the maximal torque of the envelope in the surrounding area U(α) is determined and stored. With every surrounding area position U(α) is associated a maximum torque.

After the running-through of the surrounding area U(α) for all azimuth angles and registrations of the highest torques the surrounding area U($α_w$) is selected whose highest torque is globally the smallest. The selected surrounding area U($α_w$) is marked in FIG. 4.

The middle point of the selected surrounding area U($α_w$) is the azimuth angle for servicing purposes $α_w$. The azimuth angle for servicing purposes in FIG. 4 is $α_w$=135° and is valid for arbitrary rotor angles.

The size of the surrounding area U=±10° is selected such that it accounts for the primary variations in the direction of the wind at the location of installation of the wind power plant.

The azimuth angle for servicing purposes $\alpha_w$ is a function of the tilt angle $\beta$, the cone angle $\gamma$ and the twist and geometry of the rotor blade. For a prescribed constellation the azimuth angle for servicing purposes $\alpha_w$ is a fixed feature of the wind power plant.

For the performance of servicing at the wind power plant the machinery housing 10 of the wind power plant is rotated into the azimuth angle for servicing purposes of $\alpha_w=135°$ relative to the direction of the wind and repositioned in the case of changing wind direction with the wind tracking installation to the direction of the wind, wherein the rotor blades always remain in feathered position. The variations in the wind direction that arise during the servicing work thereby generate a minimal highest torque at the rotor 20.

A variant of the method described above is also conceivable for the determination of the azimuth angle for servicing purposes. Thereby an envelope is not determined for all rotor angles $\delta$, but a rotor angle $\delta$ is determined and the curve that is parameterized with the determined rotor angle $\delta$ is itself subjected to the method described above as an envelope. In this case the envelope coincides with the measurement curve.

An additional variant of the method according to the invention of the determination of the azimuth angle for servicing purposes $\alpha_w$ by means of simulation calculations provides the following approach:

Since load simulations with turbulent wind fields are computation time-wise very intensive and therefore expensive, a coarse estimate of the torques present for different combinations of rotor angle $\delta$ and azimuth angles $\alpha$ at constant wind velocity is performed. Preferably this is achieved by means of respectively one simulation calculation, wherein for a fixed rotor angle $\delta$ the azimuth angle $\alpha$ is varied from 0 to 360° so that a curve according to FIG. 4 results for every rotor angle. In a second step areas of potential azimuth angles for servicing purposes $\alpha_w$ are selected from the course of the curve; in the presented course of the curve for example the areas around the azimuth angles of 50° and 135° appear to be particularly interesting. In a third step additional simulation calculations with turbulent wind fields are performed for these selected angle areas. The selection of the final azimuth angle for servicing purposes $\alpha_w$ takes then place on the basis of the torque envelopes determined in these turbulent simulations.

The determination of the torque envelopes takes place according to the method described above. A particularly preferred approach provides that from each combination of rotor angle $\delta$ and azimuth angles $\alpha$ for example 6 or 10 turbulent 10-minute time series are simulated, whose wind field represents for example the yearly wind, meaning the maximal wind velocity to be expected over the course of one year. From each time series the maximum value of the torque is then determined. The 6 or 10 maximum values of the torque of the individual time series are then determined arithmetically and this average value is used as the nominal value of the torque envelope. The costly, turbulent simulations are thereby limited to a few, pre-selected surrounding areas. One still obtains for the selected azimuth angle for servicing purposes $\alpha_w$ the high design tolerance safety of a simulation with a turbulent and therefore realistic wind field, and additional statistical assurance through a plurality of simulations.

For the implementation of the method the wind power plant features a measurement installation that permits the measurement of the rotor angle $\delta$. In the case that the rotor angle $\delta$ can no longer be modified because of a defect, the measurement installation permits their exact determination.

The wind power plant features in a variant a memory unit or is connected with one, in which a plurality of torque-azimuth angle curves that are parameterized by means of the rotor angle $\delta$ is stored. The measurement installation facilitates the selection of a torque-azimuth angle curve from the memory by means of the measurement of one rotor angle $\delta$. The measurement installation and the memory are connected with a data processing unit for this purpose.

The method described above for the determination of the azimuth angle for servicing purposes $\alpha_w$ is performed in the case of the variant for the envelope, which in that case coincides with the determined torque-azimuth angle curve.

For this purpose a surrounding area $U(\alpha)$ is selected that in turn covers essentially the variations in wind direction at the location of installation of the wind power plant, for example $U(\alpha)=10°$, and the surrounding area $U(\alpha)$ is slid along the x-axis in FIG. 4 in a continuous manner from $\alpha=0°$ to $\alpha=360°$. For every position of the surrounding area $U(\alpha)$ the highest value of the torque of the determined torque-azimuth angle curve is registered. After the run-through of the surrounding area $U(\alpha)$ across all azimuth angles $\alpha$, the highest values are compared and the minimum highest value is determined, and the surrounding area $U(\alpha_w)$ that is associated with the minimum highest value is selected.

The exact average value of the surrounding area is the azimuth angle for servicing purposes $\alpha_w$ for the determined rotor angle $\delta$.

If one carries out this method for a rotor position of 30° then the azimuth angle for servicing purposes will be determined to be approximately 280°.

The curves presented in FIG. 4 contain the cone angle $\gamma$ and the tilt angle $\beta$ as (implicit) parameters. The change of cone angle $\gamma$ and tilt angle $\beta$ modifies the curves and therefore the azimuth angle for servicing purposes $\alpha_w$. Additional curves for different cone angles $\gamma$ and tilt angles $\beta$ can also be determined, for which then likewise an azimuth angle for servicing purposes will be determined. Cone angle $\gamma$ and tilt angle $\beta$ can however, just as the blade twist, not be modified for a constructed wind power plant and therefore also do not have to be measured.

The invention claimed is:

1. Method for servicing a wind power plant having a machinery housing that can be rotated on the tower through an azimuth angle ($\alpha$) and having a rotor that can be rotated on a machinery housing through a rotor angle ($\delta$), comprising the steps of:
    i) determining for servicing purposes an azimuth angle by:
    adjusting a plurality of combinations of rotor angles ($\delta$) and azimuth angles ($\alpha$) by modifying the azimuth angle ($\alpha$) for a plurality of locked rotor angles ($\delta$) or by modifying the rotor angle ($\delta$) for a plurality of locked azimuth angles ($\alpha$);
    determining torques acting at the rotor subject to the wind field for the adjusted combinations of rotor angle ($\delta$) and azimuth angle ($\alpha$);
    associating an assigned azimuth angle ($\alpha$) with the torques;
    determining the torques by modifying the azimuth angle ($\alpha$) for a plurality of locked rotor angles ($\delta$) or by modifying the rotor angle ($\delta$) for a plurality of locked azimuth angles ($\alpha$);
    determining a torque envelope as the envelope of all torque-azimuth angle associations;
    forming surrounding areas ($U(\alpha)$) with comparable sector size of the azimuth angles ($\alpha$), and determining associated magnitude values of the torque envelopes;
    selecting a surrounding area ($U(\alpha_w)$) with magnitude-wise smaller torque envelope values than the neighboring surrounding areas; and determining the azimuth angle for servicing purposes ($\alpha_w$) which has the smallest magnitude value of the torque envelope within the selected surrounding area ($U(\alpha_w)$); and ii) rotating the machinery housing into the azimuth angle for servicing purposes ($\alpha_w$) with a fixed rotor angle ($\delta$).

2. Method according to claim 1, characterized in that the torque envelope is determined by determining a plurality of curves for a locked rotor angle ($\delta$) and a modified azimuth angle ($\alpha$) or for a locked azimuth angle ($\alpha$) and a modified rotor angle ($\delta$), and determining the torque envelope as the envelope of the plurality of curves.

3. Method according to claim 1, characterized in that within a plurality of surrounding areas ($U(\alpha)$) respectively the magnitude-wise largest torque envelope value is determined, the respectively magnitude-wise largest torque envelope values are compared with one another and that the one surrounding area ($U(\alpha_w)$) is selected whose magnitude-wise largest torque envelope value determined by these means is the smallest of the magnitude-wise largest torque envelope values that were compared with one another.

4. Method according to claim 1, characterized in that all surrounding areas ($U(\alpha)$) with respectively essentially equal sector size are selected.

5. Method according to claim 4, wherein the sector size is about ±15°.

6. Method according to claim 4, wherein the sector size is about ±8°.

7. Method according to claim 1, characterized in that a plurality of azimuth angles ($\alpha$) is prescribed and initially one of the azimuth angles ($\alpha$) is adjusted and combined with several rotor angles ($\delta$) and then additional azimuth angles ($\alpha$) are adjusted that are respectively combined with several rotor angles ($\delta$).

8. Method according to claim 1, characterized in that an average value within a selected surrounding area is determined with an angular tolerance of ±10% of the sector size of the selected surrounding area ($U(\alpha_w)$) as azimuth angle for servicing purposes ($\alpha_w$).

9. Method according to claim 1, characterized in that the azimuth angle ($\alpha$), of the selected surrounding area ($U(\alpha_w)$), that is associated with a local minimum of the torque envelope is determined as azimuth angle for servicing purposes ($\alpha_w$).

10. Method according to claim 1, characterized in that the rotor angle ($\delta$) for the determination of an azimuth angle for servicing purposes ($\alpha_w$) is held constant, wherein for a plurality of constant rotor angles ($\delta$) associated azimuth angles for servicing purposes ($\alpha_w$) with associated magnitude-wise largest torque envelope values are determined, and the respectively magnitude-wise largest torque envelope values are compared with one another and the one combination of constant rotor angle and azimuth angle for servicing purposes ($\alpha_w$) is selected as rotor angle for servicing purposes and associated azimuth angle for servicing purposes ($\alpha_w$), whose by these means determined magnitude-wise largest torque envelope value is the smallest of the magnitude-wise largest torque envelope values that were compared with one another.

11. Method for the servicing of a wind power plant with a machinery housing that is rotatable on a tower through an azimuth angle ($\alpha$) and a rotor that is rotatable through a rotor angle ($\delta$) such that: the machinery housing is rotated into an azimuth angle for servicing purposes ($\alpha_w$) that was determined according to the method of claim 1, and the machinery housing is maintained with locked rotor while retaining the azimuth angle for servicing purposes ($\alpha_w$).

12. Method according to claim 11, characterized in that the rotor prior to locking is rotated into a predetermined rotor angle for servicing purposes ($\delta$).

13. Method according to claim 11, characterized in that in an electronic memory are stored azimuth angles for servicing purposes ($\alpha_w$) that are respectively associated with different rotor angles ($\delta$), the rotor angle ($\delta$) is measured with a measurement installation that is connected with a data processing unit, by means of the data processing unit the measured rotor angle ($\delta$) is associated with the assigned azimuth angle for servicing purposes ($\alpha_w$) and a wind tracking installation rotates the machinery housing into the associated azimuth angle for servicing purposes ($\alpha_w$).

14. Method according to claim 11, characterized in that the machinery housing is rotated into an azimuth angle for servicing purposes ($\alpha_w$) between −180° to −90° or between 90° to 180°.

15. Method according to claim 14, characterized in that the machinery housing is rotated into an azimuth angle for servicing purposes ($\alpha_w$) between −170° and −100° or between 100° and 170.

16. Method according to claim 15, characterized in that the machinery housing is rotated into an azimuth angle for servicing purposes ($\alpha_w$) of −135° or +135°.

17. Method according to claim 11, characterized in that a drive train that is disposed in the machinery housing is at least partially disassembled, a communication connection between a data processing unit and a hub of the rotor is interrupted and an auxiliary installation is connected with the data processing unit, and the communication connection to the hub of the rotor is thereby simulated.

18. Wind power plant comprising a machinery housing, rotor, an electronic memory, and a wind tracking installation, wherein the machinery housing can be rotated on a tower through an azimuth angle ($\alpha$) and the rotor can be rotated on the machinery housing through a rotor angle ($\delta$), wherein the electronic memory has memory for storing azimuth angles for servicing purposes ($\alpha_w$) for associating an azimuth angle ($\alpha$) for a plurality of locked rotor angles ($\delta$) or by associating a rotor angle ($\delta$) for a plurality of locked azimuth angles ($\alpha$), and with the wind tracking installation the machinery housing can be rotated into an azimuth angle for servicing purposes ($\alpha_w$) and the azimuth angle for servicing purposes ($\alpha_w$) is the angular position of the machinery housing relative to the direction of the wind, and wherein a measurement installation of the rotor angle ($\delta$) is connected with a data processing unit, and in the data processing unit a measured rotor angle ($\delta$) can be associated with the assigned azimuth angle for servicing purposes ($\alpha_w$).

\* \* \* \* \*